United States Patent

[11] 3,542,290

| | | |
|---|---|---|
| [72] | Inventor | Thomas P. Fleer<br>Sunset Hills, Missouri |
| [21] | Appl. No. | 771,116 |
| [22] | Filed | Oct. 28, 1968 |
| [45] | Patented | Nov. 24, 1970 |
| [73] | Assignee | Aurora Corporation<br>Cleveland, Ohio<br>a corporation of Illinois |

[54] THERMOSTATIC GAS VALVE
5 Claims, 19 Drawing Figs.

[52] U.S. Cl. .................................................. 236/99, 236/15
[51] Int. Cl. ..................................................... O05d 23/02, O05g 9/06
[50] Field of Search ........................................... 236/15, 99, 1E2, 68D

[56] References Cited
UNITED STATES PATENTS

| | | | |
|---|---|---|---|
| 2,980,386 | 4/1961 | Reinhart et al. ............. | 236/15X |
| 3,069,089 | 12/1962 | Demi ............................ | 236/99 |
| 3,132,803 | 5/1964 | Wantz et al. ................. | 236/68 |

Primary Examiner—William E. Wayner
Attorney—Charles E. Markham

ABSTRACT: A thermostatic gas valve with manual plug cock for domestic oven temperature control of particularly compact and economical construction in which the valve body is constructed of a short length of mill rolled rectangular bar stock, in which the oven temperature to be maintained is selected by variably positioning the thermostatically controlled valve relative to a fixed seat and in which the thermostatically controlled valve is variably positioned by rotation of the plug cock.

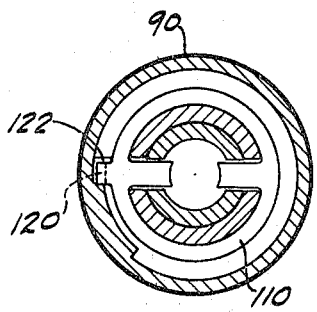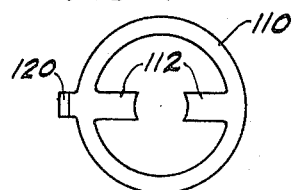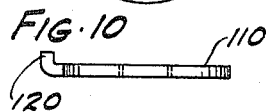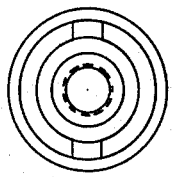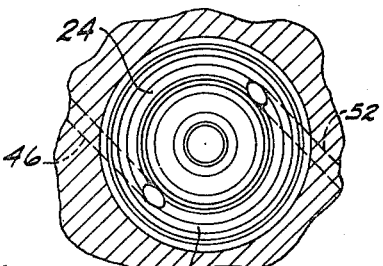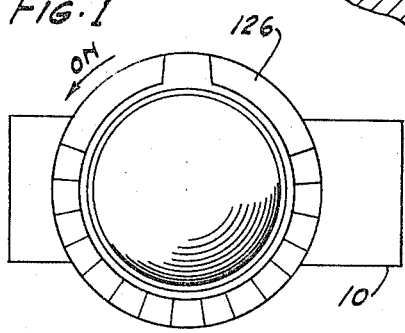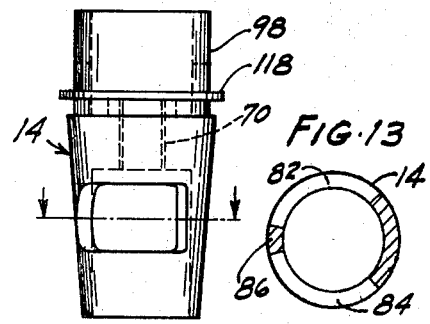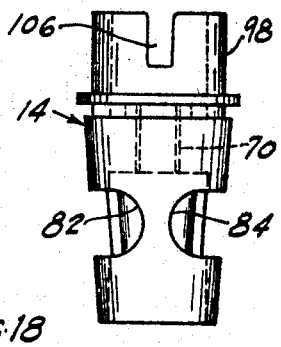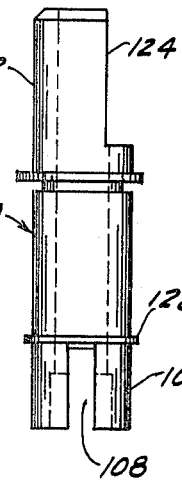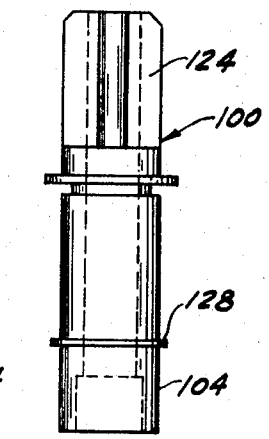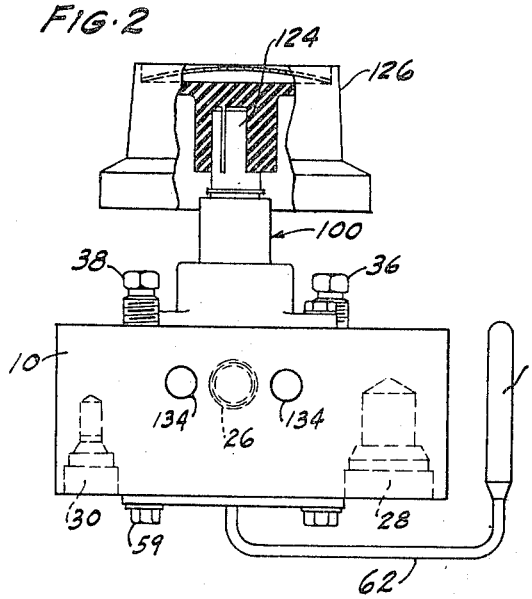

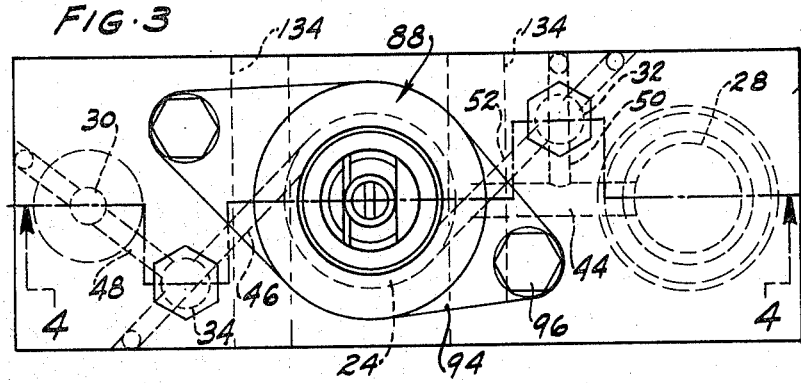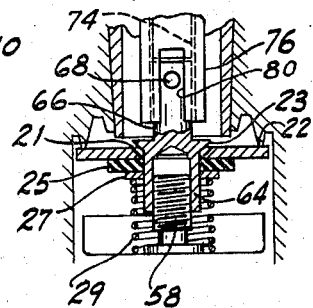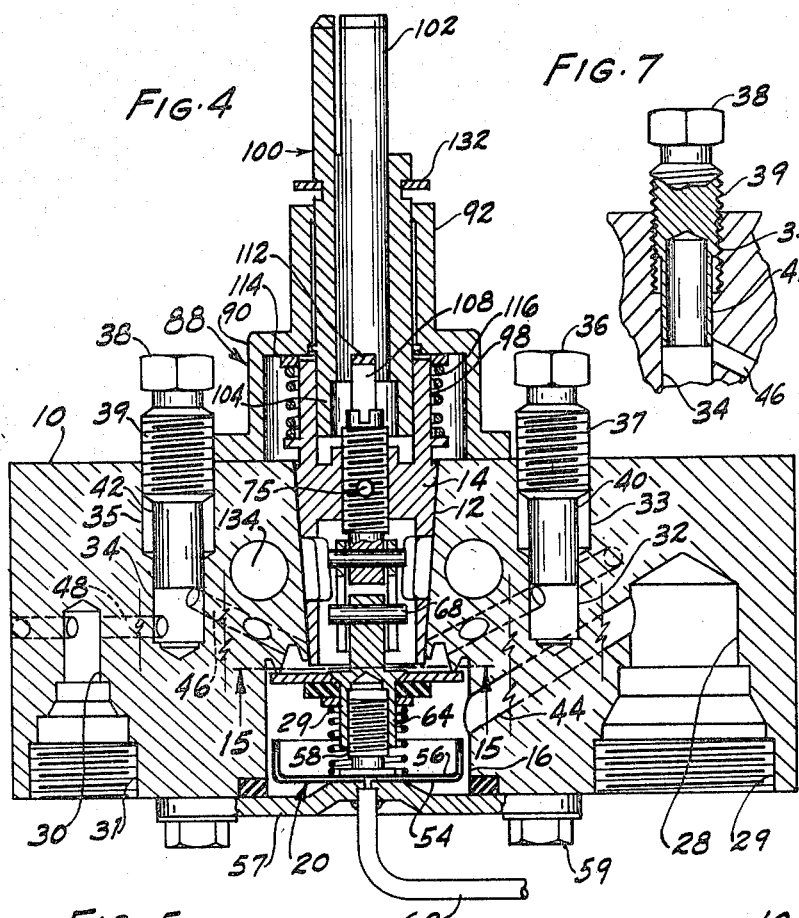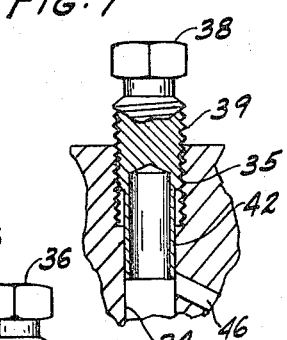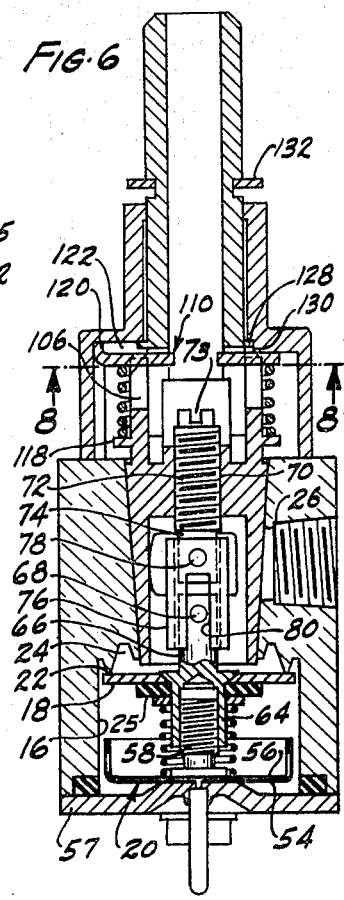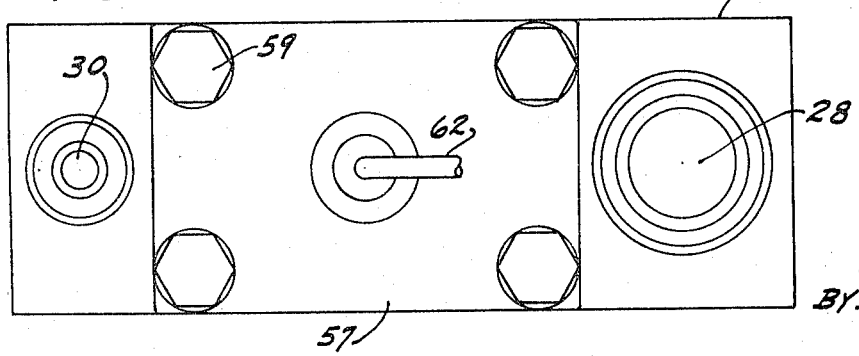
INVENTOR
THOMAS P. FLEER
BY Charles E. Markham
HIS AGENT

THERMOSTATIC GAS VALVE

This invention relates to thermostatic gas valves and particularly to the type used to control the temperature of domestic gas ovens and in which the selection of the oven temperature to be thermostatically maintained and the positioning of an "on" and "off" plug cock are accomplished by turning a single manual knob.

An object of the invention is to provide a particularly economical and reliable thermostatic valve device for domestic, gas-oven, temperature control in which the body of the device is a short length of square commercial bar stock in which fluid passages and valve seats are formed by drilling and boring, thereby to eliminate the cost of casting and construction of casting dies and to provide a valve body less likely to leak due to porosity or voids.

A further object is to provide a thermostatic gas valve device of the above type in which the thermostatically operated valve is adjustably positioned relative to a fixed seat.

A further object is to provide a thermostatic gas valve device of the above type in which the overall size has been reduced by a novel arrangement for adjusting the thermostatic valve so as to maintain the temperature selected and by arrangement and interconnection of main and auxiliary fuel passages.

Further objects and advantages will appear from the following description when read in connection with the accompanying drawings:

FIG. 1 is a full size plan view of a thermostatic valve device constructed in accordance with the present invention;

FIG. 2 is a side elevational view of the valve device shown in FIG. 1;

FIG. 3 is an enlarged top plan view of the valve device shown in FIG. 1 with the manual knob removed;

FIG. 4 is an enlarged, longitudinal, cross-sectional view of the device taken along line 4-4 of FIG. 3;

FIG. 5 is an enlarged bottom plan view of the valve shown in FIG. 1; FIG. 6 is an enlarged, transverse, cross-sectional view taken along 6-6 of FIG. 3;

FIG. 7 is a fragmentary sectional view showing a metering screw in one of the auxiliary fuel passages;

FIG. 8 is an enlarged cross-sectional view of the cap or cover member taken along line 8-8 of FIG. 6;

FIGS. 9 and 10 are enlarged plan and side elevational views, respectively, of the connecter ring;

FIG. 11 and 12 are enlarged plan and side elevational views, respectively, of the tapered plug valve;

FIG. 13 is a cross-sectional view of the tapered plug valve taken along line 13-13 of FIG. 12;

FIG. 14 is a side elevational view of the tapered plug valve shown rotated 90° counterclockwise from the position shown in FIG. 12;

FIG. 15 is a fragmentary view of the valve seat area take along line 15-15 of FIG. 4;

FIGS. 16 and 17 are top plan and side elevational views of the operating stem;

FIG. 18 is a side elevational view of the operating stem rotated 90° clockwise from the view shown in FIG. 17; and FIG. 19 is a fragmentary cross-sectional view showing an operative position of the valve disc.

Referring to the drawings in more detail, the device comprises a valve body 10 which preferably is a short length of mill-rolled, aluminum bar stock of rectangular cross-sectional configuration although it may be any suitable material of suitable size and shape formed in any suitable manner. The body 10 has a generally central, downwardly converging, tapered bore 12, extending downwardly from the upper surface thereof, which receives a hollow, tapered, plug valve 14, and a larger diameter, concentric, bore extending upward from the bottom surface thereof forming a chamber 16 which receives a disc valve 18 and an expansible chamber 20. The lower bore 16 has an annular valve seat 22 formed at the upper end thereof with which the disk valve 18 cooperates. An annular recess 24 concentric with and circumscribed by the valve seat 22 is also formed at the upper end of bore 16 for a purpose to be described.

The tapered bore 12 is intersected by a fuel inlet passage 26, which passage is screw threaded for the connection of a fuel supply conduit (not shown). The body 10 is further provided with a stepped bore 28 extending upward from the bottom surface thereof which forms a main burner fuel outlet and a stepped bore 30 also extending upward from the lower surface thereof forming a pilot burner outlet. The stepped bores 28 and 30 are provided with screw-threaded counterbores 29 and 31 for the screw-threaded attachment of fuel conduits (not shown) leading from the valve device to main and pilot burners.

The valve body 10 is further provided with bores 32 and 34 having screw-threaded counterbores 33 and 35, respectively, extending downward from the upper surface thereof and which receive flow metering screws 36 and 38, respectively. The metering screws 36 and 38 have screw threaded upper portions 37 and 39, respectively, engaging the counterbores 33 and 35 and smooth tubular lower portions 40 and 42 which closely fit the bores 32 and 34 and vary the flow by variably covering auxiliary fuel passages intersecting the bores 32 and 34.

The main burner outlet bore 28 is connected to the large bore or chamber 16 at a point below valve seat 22 by a diagonal passageway 44. The pilot burner outlet bore 30 is connected to the annular recess 24 by a passage 46 leading from the annular recess to vertical bore 34 and by a passage 48 leading from the bore 34 to the outlet bore 30. The main burner outlet bore 28 is also connected to the annular recess 24 by a passage 50, see FIG. 3, leading from passage 44 to bore 32 and from bore 32 to annular recess 24 by a passage 52. The flow from annular recess 24 to the pilot outlet bore 30 is, therefore, metered by metering screw 38 and the flow from annular space 24 to the main burner outlet bore 28 is metered by the metering screw 36. Passages 46, 48, 50 and 52 are formed by drilling; those portions of these bores extending from the vertical bores 32 and 34 to the outside surfaces of the valve body are plugged with balls 53 driven into the holes.

The expansible chamber 20 comprises two, thin, flexible, metal, cup-shaped, diaphragm members 54 and 56 nested and sealed together at their rims by any suitable means such as soldering or welding. The outer cup member 54 is connected at a central portion thereof to an underlying cover plate 57, and the inner cup member 56 has fixed to a central portion thereof an upstanding screw-threaded stud 58. The connection of cup member 56 to cover plate 57, and the connection of stud 58 to cup member 52 may be made in any suitable manner, as by soldering or welding. The cover plate 57 is attached to the body 10 by screws 59.

The space between cup-shaped, diaphragm members 54 and 56 is connected to a bulb 60 by a capillary tube 62, see FIG. 2. The bulb 60, the capillary tube 62, and the space between diaphragm members 54 and 56 form a sealed system containing a thermally expansible fluid, so that, as the temperature to which the bulb 60 is sensitive increases, the expansible chamber 20 expands and stud 58 is moved upward.

The disk valve 18 has an axial stem passing through a central aperture 21 therein. The valve stem comprises a downwardly extending, internally threaded, hollow portion 64 which threadedly receives the stud 58 and an upwardly extending, round, solid portion 66 provided with a transverse pin 68 fixed therein, the ends of which project from the opposite sides of stem portion 66.

The valve stem is further provided with an intermediate collar 23, see FIG. 19, which seats in the valve aperture 21. The lower surface of valve stem collar 23 and the wall defining the valve aperture 21 are formed as portions of a sphere in order to permit some universal angular movement of the valve stem 19 while maintaining good seating contact of the valve stem collar 23 in the valve aperture 21. Surrounding the lower hollow portion 64 of the valve stem is a relatively thick rubberlike washer 25 which snugly fits the valve stem and bears against the underside of disc valve 18 and underlying the washer 25 is a metal washer 27. A spring 29 biases the valve 18 upward and presses the rubberlike washer 25 firmly against the underside of the valve.

The hollow plug valve 12 has a thick closing wall at its upper end through which screw threaded axial bore 70 extends. The threaded bore 70 receives an adjusting screw 72. The adjusting screw 72 has a nonthreaded lower end portion 74 having a cross pin 78 fixed preferably and projecting from opposite sides thereof. A sleeve member 76 extends in loose-fitting relationship over the upper end portion of upwardly extending valve stem portion 66 and over the lower end portion 74 of the adjusting screw 72 and is pivotally connected to the lower end portion 74 of screw 72 by the cross pin 78 which passes through the walls thereof. The sleeve member 76 is provided with diametrically opposed vertical slots 80 extending upward from the lower end thereof which receive the extending end portions of transverse pin 68 in the upper valve stem portion 66.

The hollow portion of plug valve 12 is provided with cut out wall portions 82 and 84, see FIGS. 12 and 14, forming a two section port which is vertically alined with the inlet passage 26 in the valve body 10. The port in plug valve 12 is perferably formed in two sections, as shown, with a narrow connecting section 86, see FIG. 13, so as to provide the required circumferential extend of the port without unduly weakening the wall of the plug valve.

A cap or cover member generally indicated 88 having a lower, hollow, cylindrical portion 90, an upper, hollow, cylindrical portion 92 of smaller diameter, and a lower flange portion 94 is attached to the upper surface of valve body 10 by screws 96 passing through the flange portion. The plug valve 12 is further provided at its upper end with a hollow cylindrical portion 98 which extends above the upper surface of valve body 10 and into the lower, hollow, cylindrical portion 90 of cover member 88. A hollow operating stem generally indicated at 100 slidably received in the upper smaller portion 92 of cover 88 has an upper portion 102 extending above cover member 88 and a lower portion 104 extending into the upper hollow cylindrical portion 98 of plug valve 12.

The upwardly extending, hollow, cylindrical portion 98 of plug valve 12 and the lower end portion 104 of hollow operating stem 100, which extends thereinto, are provided with vertical slots 106 and 108, respectively, extending inwardly from the ends thereof. A connecter ring generally indicated at 110 positioned in the lower cylindrical portion 90 of cover member 88 is provided with radially inward extending legs 112 entering the slots 106 and 108, thereby to connect the operating stem 100 and plug valve 12 for rotation together, see FIGS. 4 and 6 and 9 and 10. The plug valve 12 is biased downward on its tapered seat, and the connecter ring 110 is biased upward against the shoulder 114 at the upper end of the lower, hollow, cylindrical, cover portion 90 by a compression spring 116 bearing against the underside of connecter ring 110 and against a collar 118 formed on the upper cylindrical portion of plug valve 12.

The connecter ring 110 has an upwardly extending tang 120 at its periphery which enters a depression 122 formed in the shoulder 114, see FIGS. 6 and 8, thereby providing a spring pressed, safety detent means which requires a slight downward movement of operating stem 100 to permit rotation of the operating stem and plug valve. The upper projecting end portion 102 of the operating stem 100 is provided with a flat surface 124 adapting it to be received in an accommodating noncircular socket in knob 126.

The operating stem 100 is further provided with an integral collar 128 which engages the bottom of a counterbore 130 in cover member 88 to limit the upward movement of the operating stem, and the stem is biased in this upper position by spring 116 through the engagement of leg 112 of connecter ring 110 with the upper end of slot 108 see FIG. 4. The downward movement of operating stem 100 is limited by a snap ring 132 which engages the upper end of the cover member 88.

The adjusting screw 72 is provided with a screw driver slot 73 and a transverse nylon plug 75 which engages the screw threads of screw threaded bore 70 in the plug valve thereby requiring considerable force to turn the adjusting screw. A pair of transverse bores 134 through the body 10 are provided to receive mounting bolts.

The valve device is shown in an "off" and cold position with the wall of plug 14 extending across the fuel inlet 26. To supply gas to the oven burners the knob 126 is pressed downward slightly to disengage the detent 120 and is then turned counterclockwise.

As knob 126 is rotated counterclockwise the plug valve 14 is caused to rotate with it due to its interconnection with operating stem 100 by the connecter ring 110. The valve stem is also caused to rotate with the knob 126 due to its connection to plug valve 14 through adjusting screw 72 and slotted sleeve member 76. Counterclockwise rotation of the valve stem causes its lower hollow threaded portion 64 to be screwed downward on threaded stud 58 thereby moving valve 19 downward off of its seat 22. The stud 58 and hollow stem portion 64 have left hand screw threads.

When knob 126 is rotated counterclockwise sufficiently fuel will flow from the inlet 26 to the main burner outlet 28 through the hollow plug valve, past the valve seat 22 into chamber 16 and from chamber 16 through passage 44 to outlet 28. Under these conditions gas will also flow from the inlet 26 through the hollow plug valve 14 to the annular recess 24 and from there to main burner outlet 28 and pilot burner outlet 30. Gas flows from annular recess 24 to the main burner outlet 28 through passage 52, vertical bore 32, passage 50 and passage 44 and from annular recess 24 to the pilot burner outlet 30 through passage 46, vertical bore 34 and passage 48, see FIGS. 3 and 4.

The flow from annular recess 24 to main burner outlet 28 is manually varied by metering screw 36 and the flow from recess 24 to the pilot burner outlet 30 by metering screw 34. The flow from the annular recess to the main burner outlet is adjusted so as to maintain a low flame at the main burner when valve 18 is closed and the flow to the pilot burner outlet 30 is adjusted to provide a safe minimum standby pilot flame.

When knob 126 is rotated counterclockwise sufficiently to open valve 18 and the burners are ignited, the position of valve 18 and therefore the flow passing it will be thermostatically varied in accordance with requirements to maintain some selected oven temperature by the thermal expansion and contraction of the liquid in the bulb 60 which is positioned so as to be responsive to oven temperature. The oven temperature to be maintained is selected by rotatably positioning knob 126 in accordance with calibrated temperature markings thereon (not shown).

Under conditions in which the knob is turned clockwise to a low oven temperature position following a period of high oven temperature operation, the expanded condition of expansible chamber 20 will cause valve 18 to engage its seat 21 prematurely and valve stem collar 23 will as a result be lifted somewhat from its seat in valve aperture 21, as shown in FIG. 19.

Under these conditions the rubberlike washer 25 which snugly fits the lower stem portion 64 and is pressed firmly against the underside of valve 18 prevents leakage between the valve and stem which would result in a higher oven temperature than desired.

The resistance to the turning of screw 72 provided by the nylon plug 75 assures rotational adjustment of the valve stem portion 64 on threaded stud 58 and provides a convenient means of calibration, that is, by insertion of a screw driver through the hollow stem 100.

The foregoing description is intended to be illustrative and not limiting the scope of the invention being set forth in the appended claims.

I claim:

1. In a thermostatic gas valve, a body having a tapered bore converging inward from one side thereof and entering a concentric chamber of larger diameter formed as a bore entering from the opposite side thereof, a hollow, tapered, open end, rotary plug cock seated in said tapered bore, an inlet passageway in said body intersecting said tapered bore and said plug cock having a circumferentially extensive port in the wall thereof adapted to register with said intersecting inlet passage thereby to open communication between said inlet and said chamber, a fixed annular valve seat formed in said body at the inner end of the bore forming said chamber, a disc valve cooperating with said valve seat and including a valve stem having portions extending from both sides thereof, a main burner outlet passageway leading from said chamber, a thermostatic actuator, one extending portion of said valve stem having a screw threaded connection with said actuator, slot and pin means operatively connecting the opposite extending portion of said valve stem with said rotary plug cock for rotational movement therewith, whereby rotation of said plug cock effects axial movement of said disk valve relative to said actuator and relative to its fixed seat, and annular recess formed in said body at the inner end of said bore forming said chamber, said recess lying within and being circumscribed by said valve seat and being in direct communication with said inlet passage via said plug port, a pilot burner outlet formed in said body, a passageway connecting said pilot outlet with said annular recess, and a passageway connecting said main burner outlet passageway with said recess.

2. A thermostatic gas valve as claimed in claim 1, in which said valve stem is slidably arranged in a central perforation in said disc valve, in which said valve stem includes a rigid collar thereon engaging the seating side of said valve, and a soft rubberlike washer closely fitted thereon and engaging the opposite side of said disc valve, and in which means biasing said soft washer firmly against said other side of said disc valve is provided.

3. A thermostatic gas valve as claimed in claim 1 in which said slot and pin means connecting said valve stem with said rotary plug cock includes a slotted member having an axially extending screw threaded portion threadedly engaged in said plug cock thereby to permit the angular positioning of said slot and pin means relative to said port in the wall of said plug cock, and means associated with said screw threaded portion of said member for increasing its resistance to turning when in threaded engagement.

4. A thermostatic gas valve as claimed in claim 2 in which said central perforation in said disc valve is defined by a concave annular seat of spherical form on the seating side of said disc valve and in which said rigid collar on said valve stem has an annular surface of spherical form engaging said seat thereby to permit slight relative universal angular movement of said disc valve and said valve stem while maintaining seating engagement of said disc valve on its seat.

5. A thermostatic gas valve as claimed in claim 1 in which said body comprises a short length of mill-rolled aluminum bar stock of rectangular cross-sectional configuration in which said passages, bore and chamber are drilled and bored respectively.